US011987121B2

(12) United States Patent
Shoji

(10) Patent No.: US 11,987,121 B2
(45) Date of Patent: May 21, 2024

(54) INFORMATION PROCESSING DEVICE, PROGRAM, AND INFORMATION PROCESSING METHOD

(71) Applicant: TOYOTA JIDOSHA KABUSHIKI KAISHA, Toyota (JP)

(72) Inventor: Keisuke Shoji, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 244 days.

(21) Appl. No.: 17/589,323

(22) Filed: Jan. 31, 2022

(65) Prior Publication Data

US 2022/0266693 A1 Aug. 25, 2022

(30) Foreign Application Priority Data

Feb. 22, 2021 (JP) ................. 2021-026637

(51) Int. Cl.
| | | |
|---|---|---|
| *B60K 35/00* | (2024.01) | |
| *H04W 4/46* | (2018.01) | |
| *B60K 35/23* | (2024.01) | |
| *B60K 35/28* | (2024.01) | |
| *B60K 35/29* | (2024.01) | |
| *B60K 35/85* | (2024.01) | |

(52) U.S. Cl.
CPC ............... *B60K 35/00* (2013.01); *H04W 4/46* (2018.02); *B60K 35/23* (2024.01); *B60K 35/28* (2024.01); *B60K 35/29* (2024.01); *B60K 35/85* (2024.01); *B60K 2360/177* (2024.01); *B60K 2360/1868* (2024.01); *B60K 2360/5915* (2024.01)

(58) Field of Classification Search
CPC ............ B60K 35/00; B60K 2370/1529; B60K 2370/177; B60K 2370/1868; B60K 2370/193; B60K 2370/5915; B60K 2370/174; B60W 50/14; B60W 2050/0043; B60W 2050/146; H40W 4/46; H04L 67/12; G08G 1/096791; G08G 1/0965; G08G 1/096716; G08G 1/096725; G08G 1/096741; G08G 1/09675; G08G 1/096775
See application file for complete search history.

(56) References Cited

U.S. PATENT DOCUMENTS

| | | | |
|---|---|---|---|
| 11,302,209 B2 * | 4/2022 | Skagius | .................. G07C 5/06 |
| 2017/0032673 A1 * | 2/2017 | Scofield | .................. H04L 67/02 |
| 2018/0144640 A1 * | 5/2018 | Price | ..................... B60W 30/14 |
| 2019/0373419 A1 * | 12/2019 | Bayley | ................. H04W 4/027 |

(Continued)

FOREIGN PATENT DOCUMENTS

| | | |
|---|---|---|
| EP | 2 945 128 A1 | 11/2015 |
| JP | 2008-006994 A | 1/2008 |

(Continued)

*Primary Examiner* — Phutthiwat Wongwian
*Assistant Examiner* — Sherman D Manley
(74) *Attorney, Agent, or Firm* — Oliff PLC

(57) ABSTRACT

An information processing device that is able to communicate with a vehicle includes: a control unit; and a communication unit. The control unit acquires driving information of another vehicle traveling around the vehicle via the communication unit, and transmits at least part of the driving information to the vehicle via the communication unit when the driving information indicates content of driving that reduces wear and tear of a component of the other vehicle.

9 Claims, 6 Drawing Sheets

(56) References Cited

U.S. PATENT DOCUMENTS

| | | | | |
|---|---|---|---|---|
| 2020/0004269 A1* | 1/2020 | Oba | ................. | G08G 1/096791 |
| 2020/0334980 A1* | 10/2020 | Ludwig | ................... | H04W 4/44 |
| 2020/0342760 A1* | 10/2020 | Vassilovski | ............. | H04W 4/06 |
| 2020/0349833 A1* | 11/2020 | Lerner | ............. | G08G 1/096725 |
| 2021/0203462 A1* | 7/2021 | Xiang | ................... | H04L 5/0044 |
| 2021/0263165 A1* | 8/2021 | Zheng | .................... | G01S 19/04 |
| 2022/0084655 A1* | 3/2022 | Matsubara | ......... | G01C 21/3679 |
| 2023/0054037 A1* | 2/2023 | Switkes | ................... | G08G 1/22 |

FOREIGN PATENT DOCUMENTS

| | | |
|---|---|---|
| JP | 2008-94167 A | 4/2008 |
| JP | 2016-18317 A | 2/2016 |

* cited by examiner

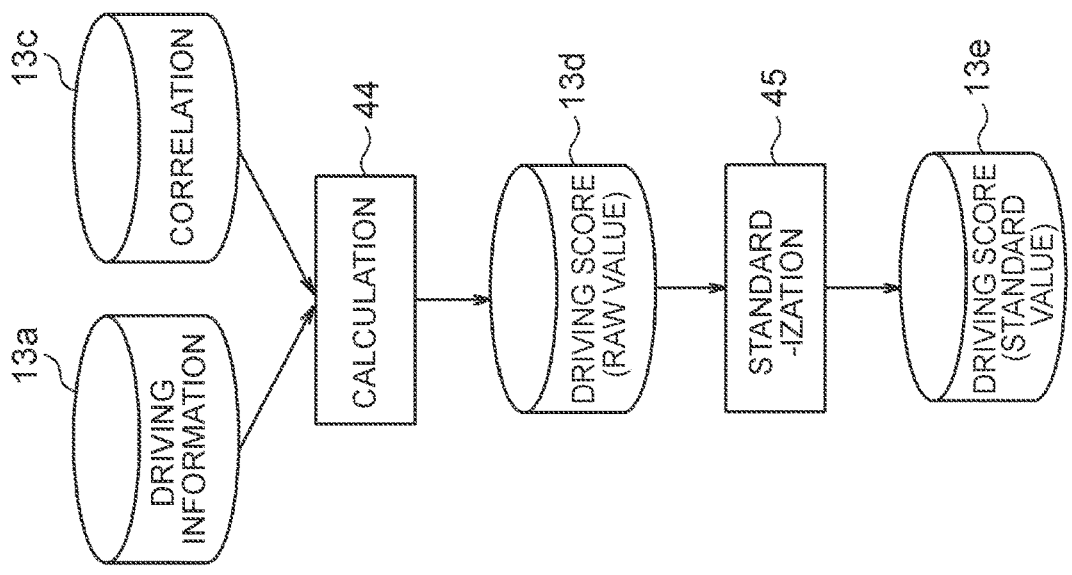
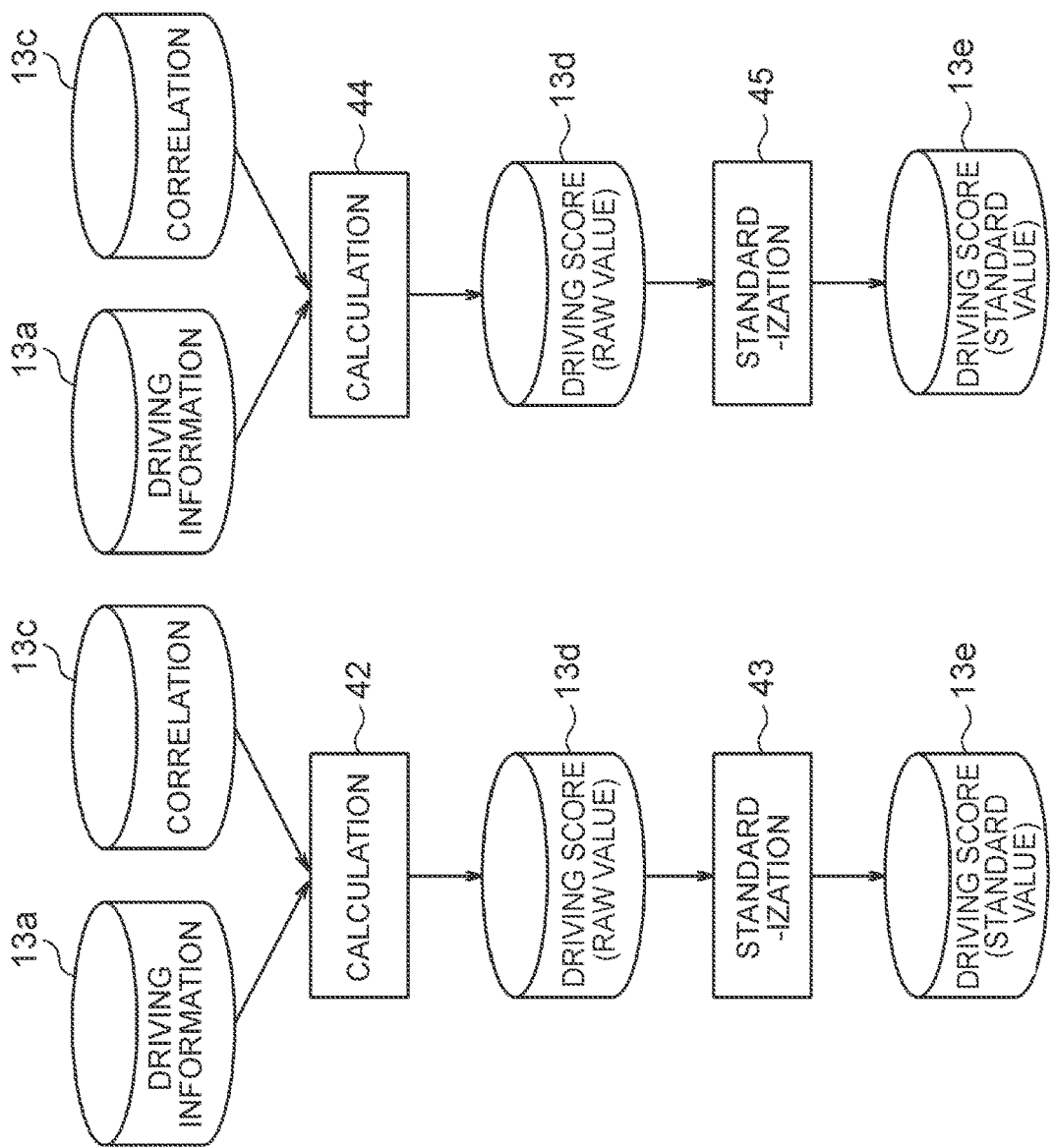
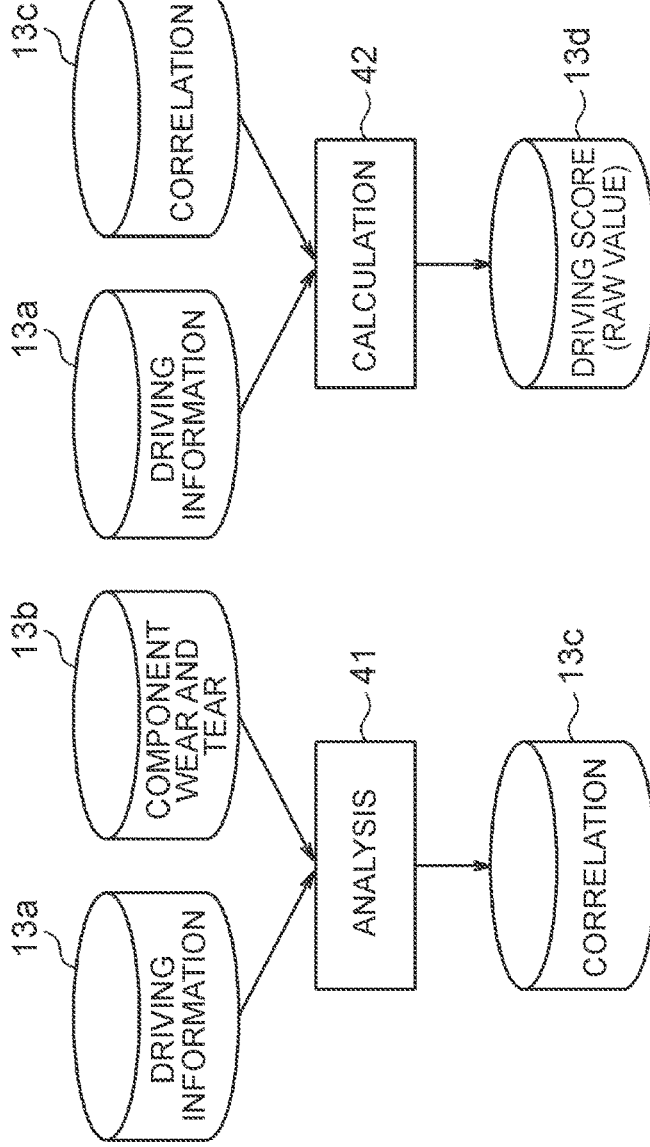
FIG. 4A
FIG. 4B
FIG. 4C

INFORMATION PROCESSING DEVICE, PROGRAM, AND INFORMATION PROCESSING METHOD

CROSS-REFERENCE TO RELATED APPLICATION

This application claims priority to Japanese Patent Application No. 2021-026637 filed on Feb. 22, 2021, incorporated herein by reference in its entirety.

BACKGROUND

1. Technical Field

The present disclosure relates to an information processing device, a program, and an information processing method.

2. Description of Related Art

There is a known technique that prompts a driver to use engine braking when the ratio of a deceleration generated by brake operation to a deceleration generated in a vehicle exceeds a predetermined threshold value (for example, Japanese Unexamined Patent Application Publication No. 2008-006994 (JP 2008-006994 A)).

SUMMARY

The above technique only prompts the driver to use engine braking. Therefore, there may be no effect of attracting the driver's attention.

An object of the present disclosure made in view of such circumstances is to provide an information processing device, a program, and an information processing method capable of providing a notification that easily attracts the driver's attention.

An information processing device according to an embodiment of the present disclosure is an information processing device that is able to communicate with a vehicle. The information processing device includes: a control unit; and a communication unit. The control unit acquires driving information of another vehicle traveling around the vehicle via the communication unit, and transmits at least part of the driving information to the vehicle via the communication unit when the driving information indicates content of driving that reduces wear and tear of a component of the other vehicle.

A program according to an embodiment of the present disclosure causes a computer serving as an information processing device that is able to communicate with a vehicle to perform operations including: acquiring driving information of another vehicle traveling around the vehicle; and transmitting at least part of the driving information to the vehicle when the driving information indicates content of driving that reduces wear and tear of a component of the other vehicle.

An information processing method according to an embodiment of the present disclosure is an information processing method with an information processing device that is able to communicate with a vehicle. The information processing method includes: acquiring driving information of another vehicle traveling around the vehicle; and transmitting at least part of the driving information to the vehicle when the driving information indicates content of driving that reduces wear and tear of a component of the other vehicle.

With the information processing device, the program, and the information processing method according to an embodiment of the present disclosure, it is possible to provide a notification that easily attracts the driver's attention.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4A is a diagram showing a method of calculating a driving score;

FIG. 4B is a diagram showing a method of calculating a driving score;

FIG. 4C is a diagram showing a method of calculating a driving score;

DETAILED DESCRIPTION OF EMBODIMENTS

Figure 1:
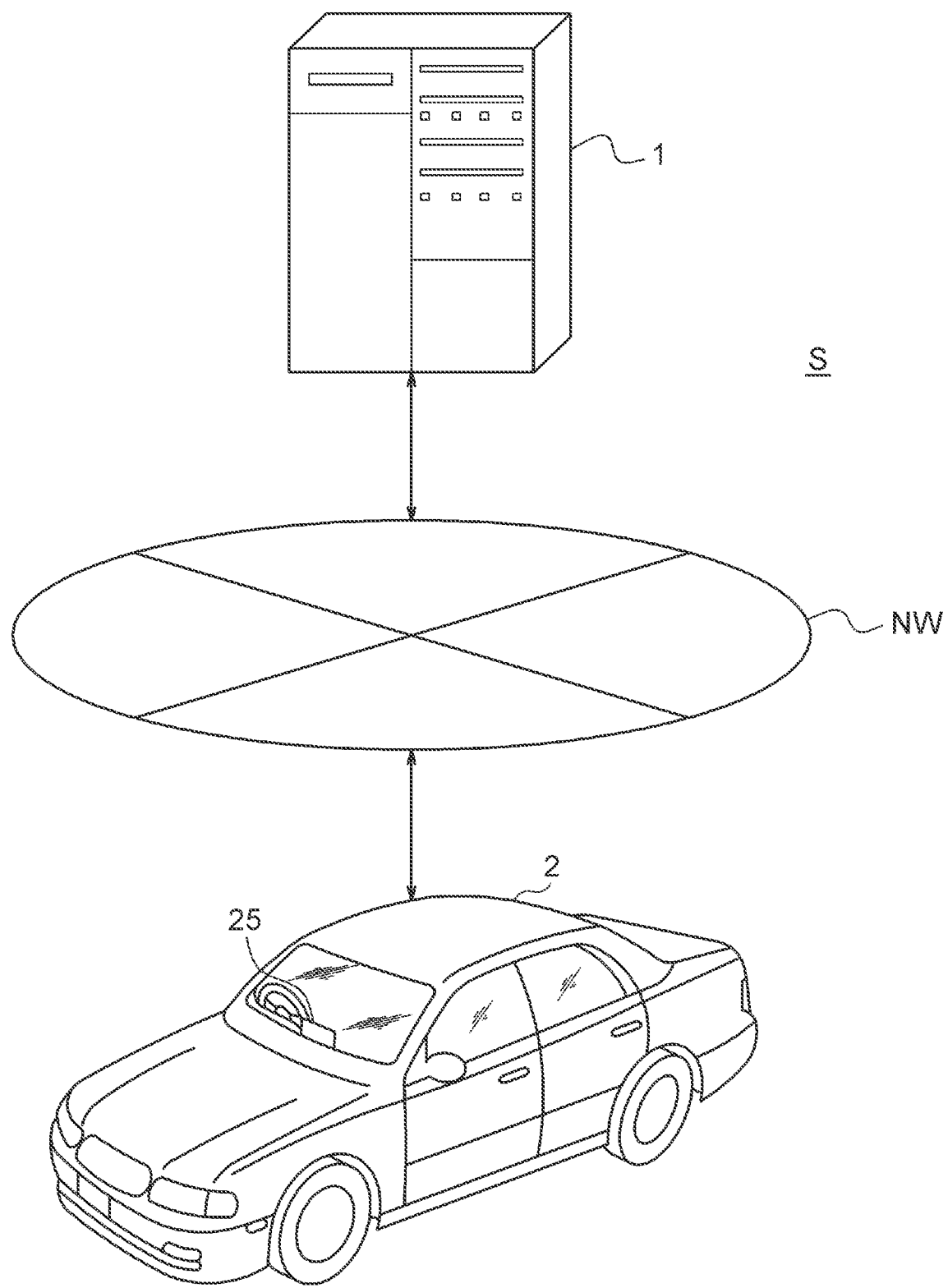
FIG. 1 is a schematic diagram of an information processing system according to the present embodiment.

FIG. 1 is a schematic diagram of an information processing system S according to the present embodiment. The information processing system S includes an information processing device 1 and a vehicle 2. The information processing device 1 can communicate with the vehicle 2 via a network NW. The network NW includes, for example, a mobile communication network or the Internet.

In FIG. 1, for convenience of description, one information processing device 1 is shown. However, the number of information processing devices 1 is not limited to this. For example, the processes executed by the information processing device 1 may be executed by a plurality of information processing devices 1 disposed in a distributed manner.

The outline of the processes executed by the information processing device 1 according to the present embodiment will be described. The information processing device 1 acquires driving information of another vehicle 3 traveling around the vehicle 2 via a communication unit 12. When the driving information indicates content of driving that reduces wear and tear of components of the other vehicle 3, the information processing device 1 transmits at least part of the driving information to the vehicle 2 via the communication unit 12. With this configuration, the information processing device 1 can notify the driver of the vehicle 2 of the content of driving that reduces the wear and tear of the components, and thus can attract the attention of the driver who wants to extend the life of the components.

The information processing device 1 may be a server that supports the provision of services by a business operator. The information processing device 1 may be installed in, for example, facilities dedicated to the business operator or a shared facilities including a data center. As an alternative example, the information processing device 1 may be mounted on the vehicle 2.

The vehicle 2 includes any type of vehicle, such as a gasoline vehicle, a diesel vehicle, an HV, a PHV, an EV, and an FCV. The term "HV" is an abbreviation for "hybrid vehicle". The term "PHV" is an abbreviation for "plug-in hybrid vehicle". The term "EV" is an abbreviation for "electric vehicle". The term "FCV" is an abbreviation for "fuel cell vehicle". The vehicle 2 is driven by the driver in the present embodiment. The vehicle 2 may be autonomously driven at any level. The level of autonomous driving is, for example, one of levels 1 to 5 in the SAE leveling, for example. The term "SAE" is an abbreviation for the "Society of Automotive Engineers". The vehicle 2 may be a MaaS dedicated vehicle. The term "MaaS" is an abbreviation for "mobility as a service".

Figure 2:
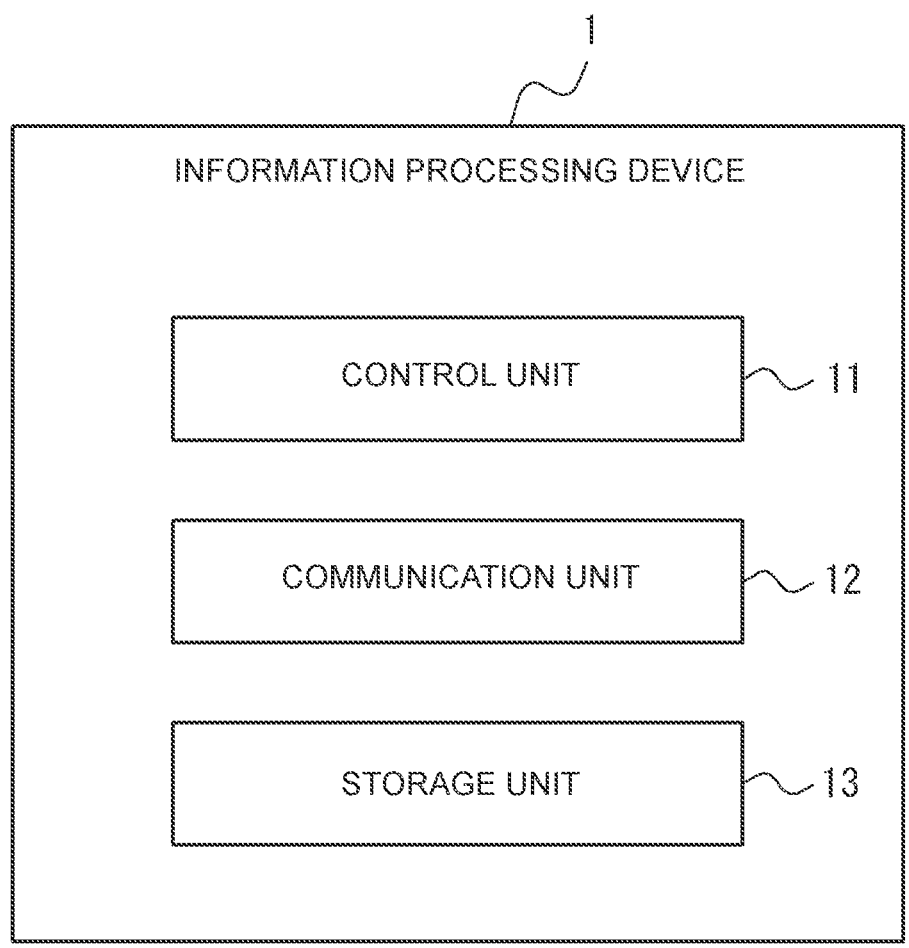
FIG. 2 is a block diagram showing a configuration of an information processing device.

The internal configuration of the information processing device 1 will be described in detail with reference to FIG. 2.

The information processing device 1 includes a control unit 11, the communication unit 12, and a storage unit 13. The constituent components of the information processing device 1 are connected so as to be able to communicate with each other via a dedicated line, for example.

The control unit 11 includes, for example, one or more general-purpose processors including a central processing unit (CPU) or a micro-processing unit (MPU). The control unit 11 may include one or more dedicated processors specialized for a specific process. The control unit 11 may include one or more dedicated circuits instead of the processor. The dedicated circuit may be, for example, a field-programmable gate array (FPGA) or an application-specific integrated circuit (ASIC). The control unit 11 may include an electronic control unit (ECU).

The communication unit 12 includes a communication module conforming to one or more wired or wireless local area network (LAN) standards for connecting to the network. The communication unit 12 may include a module conforming to one or more mobile communication standards such as the long term evolution (LTE), the fourth generation (4G), or the fifth generation (5G). The communication unit 12 may include a communication module and the like conforming to one or more short-range communication standards or specifications including Bluetooth (registered trademark), AirDrop (registered trademark), infrared data association (IrDA), ZigBee (registered trademark), FeliCa (registered trademark), or radio frequency identifier (RFID). The communication unit 12 transmits and receives information via the network NW.

The storage unit 13 includes a semiconductor memory, a magnetic memory, an optical memory, or a combination of at least two of them. However, the disclosure is not limited to this. The semiconductor memory is, for example, a random access memory (RAM) or a read-only memory (ROM). The RAM is, for example, a static RAM (SRAM) or a dynamic RAM (DRAM). The ROM is, for example, an electrically erasable programmable read-only memory (EEPROM). The storage unit 13 may function as, for example, a main storage device, an auxiliary storage device, or a cache memory. The storage unit 13 may store information on the result of analysis or processing by the control unit 11. The storage unit 13 may store various kinds of information and the like related to the operation or control of the information processing device 1. The storage unit 13 may store a system program, an application program, embedded software, and the like. The storage unit 13 includes a driving information database (DB) 13a, a component wear and tear DB 13b, a correlation DB 13c, a driving score (raw value) DB 13d, and a driving score (standard value) DB 13e, which will be described later.

Figure 3:
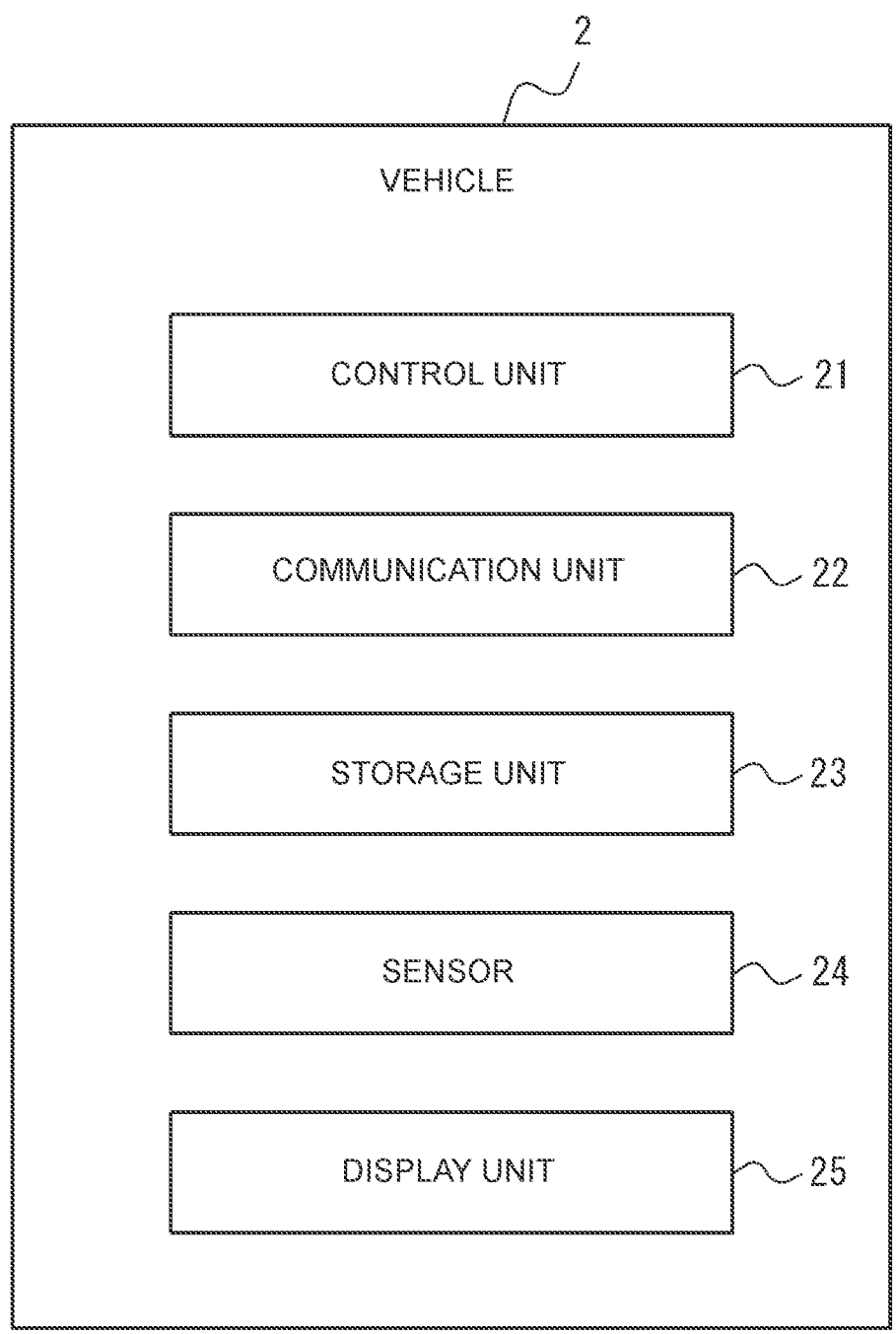
FIG. 3 is a block diagram showing a configuration of a vehicle.

The internal configuration of the vehicle 2 will be described in detail with reference to FIG. 3.

The vehicle 2 includes a control unit 21, a communication unit 22, a storage unit 23, a sensor 24, and a display unit 25. The constituent components of the vehicle 2 are connected so as to be able to communicate with each other via, for example, a dedicated line.

The hardware configurations of the control unit 21, the communication unit 22, and the storage unit 23 of the vehicle 2 may be the same as the hardware configurations of the control unit 11, the communication unit 12, and the storage unit 13 of the information processing device 1, respectively. The description here is omitted.

The sensor 24 includes sensors for detecting the content of driving of the vehicle 2 or an interface for the sensors. The sensors include sensors that detect, for example, a speed, a forward-backward acceleration, a lateral acceleration, a deceleration, an accelerator operation amount, a brake operation amount, a steering angle of a steering wheel, an eco-mode selection state, an odometer value, engine specifications, and the like of the vehicle 2. The content of driving may indicate driving operations such as a way of acceleration, a way of deceleration, a way of operating a steering wheel, usage of engine braking, eco-mode selection, line taking, and the like, or may indicate that no driving operation is made. The sensor 24 transmits the detected content of driving to the control unit 21 as the driving information.

The sensor 24 may further include an image sensor, a position information sensor, and the like. The image sensor may include a camera. The position information sensor includes at least one GNSS receiver. The term "GNSS" is an abbreviation for "global navigation satellite system". The GNSS includes, for example, at least one of GPS, QZSS, BeiDou, GLONASS, and Galileo. The term "GPS" is an abbreviation for "global positioning system". The term "QZSS" is an abbreviation for "quasi-zenith satellite system". The satellites of the QZSS are referred to as quasi-zenith satellites. The term "GLONASS" is an abbreviation for "global navigation satellite system". The sensor 24 measures the position of the information processing device 1. The result of the measurement by the sensor 24 is acquired by the control unit 21 as the position information of the information processing device 1. The "position information" is information that can specify the position of the vehicle 2, and includes, for example, coordinates.

The display unit 25 includes at least one output interface. The display unit 25 of the present embodiment is a head-up display (HUD) mounted on the vehicle 2. The display unit 25 includes, for example, a combiner. The display unit 25 projects a virtual image onto the real space. The display unit 25 outputs information obtained through the operation of the vehicle 2.

As an alternative example, the display unit 25 may be an augmented reality (AR) glass that is attached and operated by the driver of the vehicle 2. When the display unit 25 is the AR glass, the output interface is, for example, an LCD or an organic EL display. The term "LCD" is an abbreviation for "liquid crystal display". The term "EL" is an abbreviation for "electroluminescence".

As another alternative example, the display unit 25 may be an LCD or an organic EL display provided in the vehicle 2. The display unit 25 is visually recognized by the driver of the vehicle 2.

The display unit 25 may be connected to the vehicle 2 as an external output device instead of being provided in the vehicle 2. As a connection method, for example, any method such as a universal serial bus (USB), a high-definition multimedia interface (HDMI) (registered trademark), or Bluetooth (registered trademark) can be used.

Hereinafter, the processes executed by the information processing system S according to the present embodiment will be described in detail. Here, as an example, a scene in which the user is driving the vehicle 2 on which the display unit 25 is mounted will be described.

The information processing device 1 acquires from the vehicle 2 the driving information of the vehicle 2. The information processing device 1 acquires the driving information of the other vehicle 3 traveling around the vehicle 2 from the other vehicle 3. The wording "around" represents, for example, being within a predetermined distance.

The information processing device 1 calculates a driving score for each of the vehicle 2 and the other vehicle 3 from the driving information.

An example of a method of calculating the driving score will be described in detail with reference to FIG. 4A to 4C.

A first learning stage will be described in detail with reference to flow of FIG. 4A. Here, ways of driving and degrees of wear and tear of components caused by the ways of driving are learned. The components may be consumables. The components may be, for example, tires or brake pads. The wear and tear may be wear. The driving information DB 13a and the component wear and tear DB 13b store the actual value of the driving information and the actual value of wear and tear of the components, respectively, acquired from one or more vehicles. The actual value of the driving information may be acquired from one or more vehicles via the network NW. The actual value of the driving information may be associated with vehicle identification information, position information corresponding to the driving information, and time corresponding to the driving information. Wear and tear of the components may be associated with the vehicle identification information. The actual values may be updated regularly. The acquired driving information may be information on one driving operation or information on a plurality of driving operations within a predetermined period. The actual value of wear and tear of the components may be measured by a user or maintenance personnel for each vehicle.

The information processing device 1 analyzes the actual values of the driving information DB 13a and the component wear and tear DB 13b (reference sign 41). Any method can be adopted for the analysis.

The information processing device 1 determines the correlation between the driving information and the wear and tear of the components. The correlation is, for example, as follows.

The greater the number of times of braking, the greater the wear and tear of the components
  The stronger the braking, the greater the wear and tear of the components
  The larger the steering angle of the steering wheel, the greater the wear and tear of the components
  The greater the number of times of sudden acceleration or sudden deceleration, the greater the wear and tear of the components The information processing device 1 stores the correlation information in the correlation DB 13c.

A second learning stage will be described in detail with reference to flow of FIG. 4B. Here, a process of calculating the driving score regarding wear and tear of the components for each piece of driving information and converting the driving score into a score out of 100 points is learned. The less the wear and tear of the components is, the higher the driving score may be. As an alternative example, the driving score may be converted such that the average score is 50 points instead of being converted into a score out of 100 points. The driving score may be indicated by another indicator.

The information processing device 1 refers to the driving information DB 13a and the correlation DB 13c to calculate the driving score (raw value) corresponding to the driving information (reference sign 42). The information processing device 1 stores the driving score (raw value) in the driving score (raw value) DB 13d.

The information processing device 1 performs standardization in order to convert the driving score (raw value) into a score out of 100 points (reference sign 43). The standardization is performed, for example, by applying a standardization function to the driving score (raw value).

The information processing device 1 stores the driving score (standard value) calculated as a result of standardization in the driving score (standard value) DB 13e.

An inference step will be described in detail with reference to flow of FIG. 4C. Here, a process of calculating the driving score (standard value) from newly acquired driving information will be described. The information processing device 1 stores the driving information newly acquired from the vehicle 2 and the other vehicle 3 in the driving information DB 13a. The information processing device 1 calculates the driving score (raw value) from the driving information and the correlation information (reference sign 44).

The information processing device 1 stores the driving score (raw value) in the driving score (raw value) DB 13d.

The information processing device 1 applies a standardization function to the driving score (raw value) to calculate the driving score (standard value) (reference sign 45). The information processing device 1 stores the calculated driving score (standard value) in the driving score (standard value) DB 13e.

The information processing device 1 calculates the driving score from the driving information for each of the vehicle 2 and the other vehicle 3 as described above. Hereinafter, description will be made with the driving score being a standard value. The information processing device 1 may periodically update the driving score by periodically acquiring the driving information. As an alternative example, the information processing device 1 may use information on the component cost reduced by the content of driving, instead of the information on wear and tear of the components. The information on the reduced component cost may be set by the user or maintenance personnel. In this case, the information processing device 1 may learn the correlation between the driving information and the reduced component cost according to the above-described flows of FIGS. 4A and 4B. According to the above-described flow of FIG. 4C, the information processing device 1 may calculate the reduced component cost from the newly acquired driving information.

Figure 5:
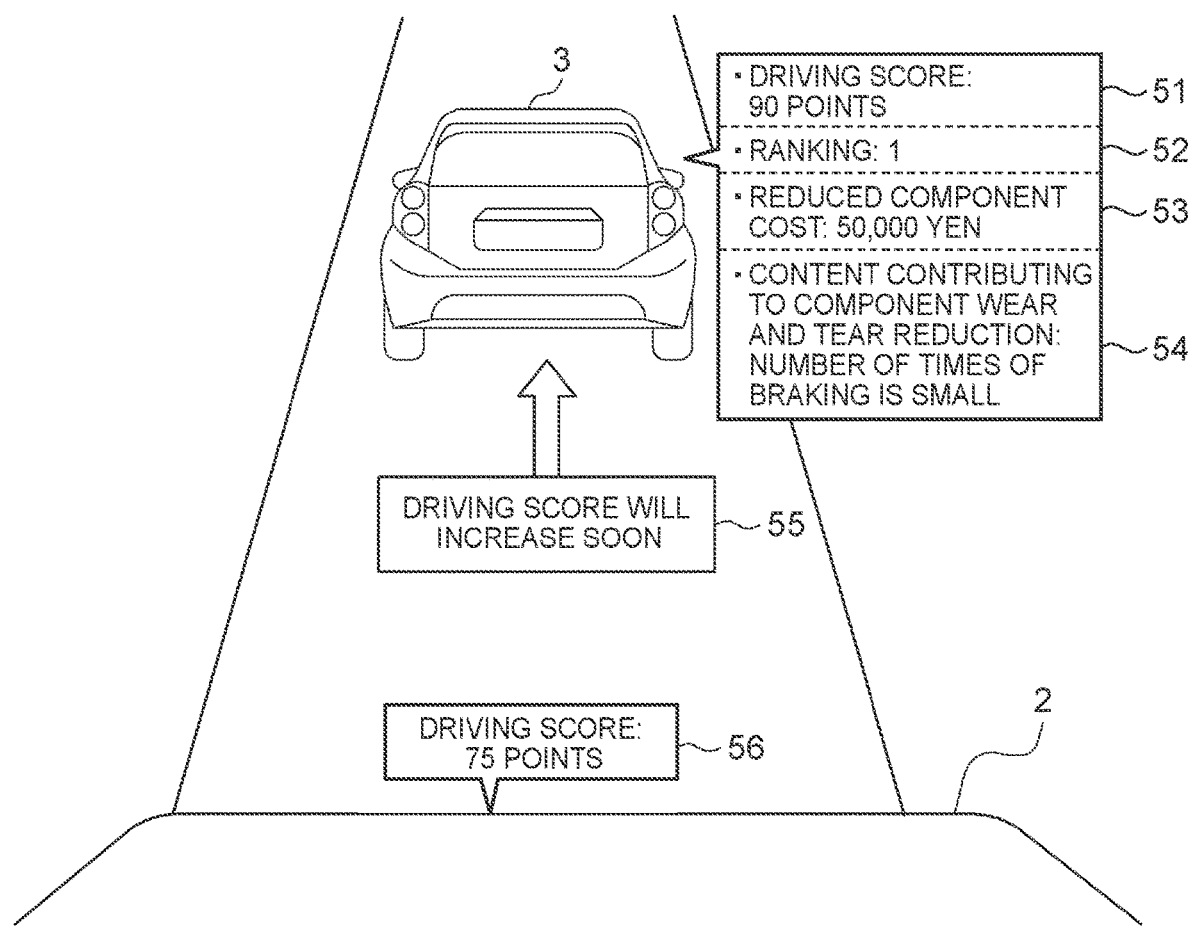
FIG. 5 is a diagram showing a projected image.

The information processing device 1 transmits to the vehicle 2 the driving score of the vehicle 2. As shown in FIG. 5, the vehicle 2 projects a driving score 56 of the vehicle 2 in association with the vehicle 2. As an additional example, the information processing device 1 may transmit to the vehicle 2 at least part of the driving information of the vehicle 2. The vehicle 2 may project at least part of the driving information. As an additional example or an alternative example, the vehicle 2 may notify, by voice, the driver of the vehicle 2 of any information acquired from the information processing device 1.

The information processing device 1 determines whether the driving information of the other vehicle 3 indicates content of driving that reduces wear and tear of the components of the other vehicle 3. For example, in the following cases, the information processing device 1 may determine that the driving information of the other vehicle 3 indicates the content of driving that reduces wear and tear of the components of the other vehicle 3.

The driving score of the other vehicle 3 exceeds a reference value

The driving score of the other vehicle 3 is higher than the driving score of the vehicle 2

The component cost reduced in the other vehicle 3 is larger than a reference value When the information processing device 1 determines that the driving information of the other vehicle 3 indicates the content of driving that reduces wear and tear of the components of the other vehicle 3, the information processing device 1 transmits at least part of the driving information and the driving score of the other vehicle 3 to the vehicle 2 via the communication unit 12. Not all the driving information of the other vehicle 3 need to be transmitted to the vehicle 2. Of the driving information of the other vehicle 3, at least the driving information indicating the content of driving that has contributed to the reduction of wear and tear of the components of the other vehicle 3 is transmitted to the vehicle 2. It is optional to transmit the driving score.

When the driving information and the driving score of the other vehicle 3 are acquired, the vehicle 2 projects a driving score 51 of the other vehicle 3 and the content of driving 54 corresponding to the driving information, as shown in FIG. 5. Here, the content of driving 54 that has contributed to the reduction of wear and tear of the components is projected.

The information processing device 1 may transmit additional information to the vehicle 2. For example, the information processing device 1 may calculate the ranking of the driving score 51 of the other vehicle 3 in the driving scores of the vehicles traveling around the vehicle 2 or the other vehicle 3. The information processing device 1 transmits ranking information to the vehicle 2. As shown in FIG. 5, the vehicle 2 projects a ranking 52.

The information processing device 1 further transmits to the vehicle 2 information on a component cost 53 reduced by the content of driving of the other vehicle 3. As shown in FIG. 5, the vehicle 2 may project the reduced component cost 53.

As an additional example or an alternative example, the information processing device 1 determines whether there is a sign of increase of the driving score from the driving information of the other vehicle 3. For example, the information processing device 1 determines, from the past driving information of the other vehicle 3, a point where the content of driving that increases the driving score has been detected. When the information processing device 1 detects that the other vehicle 3 is approaching the determined point, the information processing device 1 determines that there is a sign of increase of the driving score. Next, the information processing device 1 transmits to the vehicle 2 sign information indicating the presence of sign of increase of the driving score. As shown in FIG. 5, the vehicle 2 projects sign information 55. At this time, the vehicle 2 may be highlighted.

As an additional example, when the information processing device 1 determines that the driving score 51 of the other vehicle 3 is higher than the driving score 56 of the vehicle 2, the information processing device 1 may notify the vehicle 2 to imitate the content of driving of the other vehicle 3. For example, the information processing device 1 may notify the vehicle 2 to imitate the content of driving 54. In this case, the vehicle 2 may notify the driver by projection display or by voice to imitate the driving of the other vehicle 3.

When the information processing device 1 acquires the driving information from the vehicle 2, the information processing device 1 determines whether the content of driving of the other vehicle 3 has been imitated. When the information processing device 1 detects that the driving of the other vehicle 3 has been imitated, the information processing device 1 increases the driving score of the vehicle 2. For example, the information processing device 1 may increase the driving score of the vehicle 2 by executing the flow of FIG. 4C again, or may increase the driving score of the vehicle 2 by a reference value.

Figure 6:
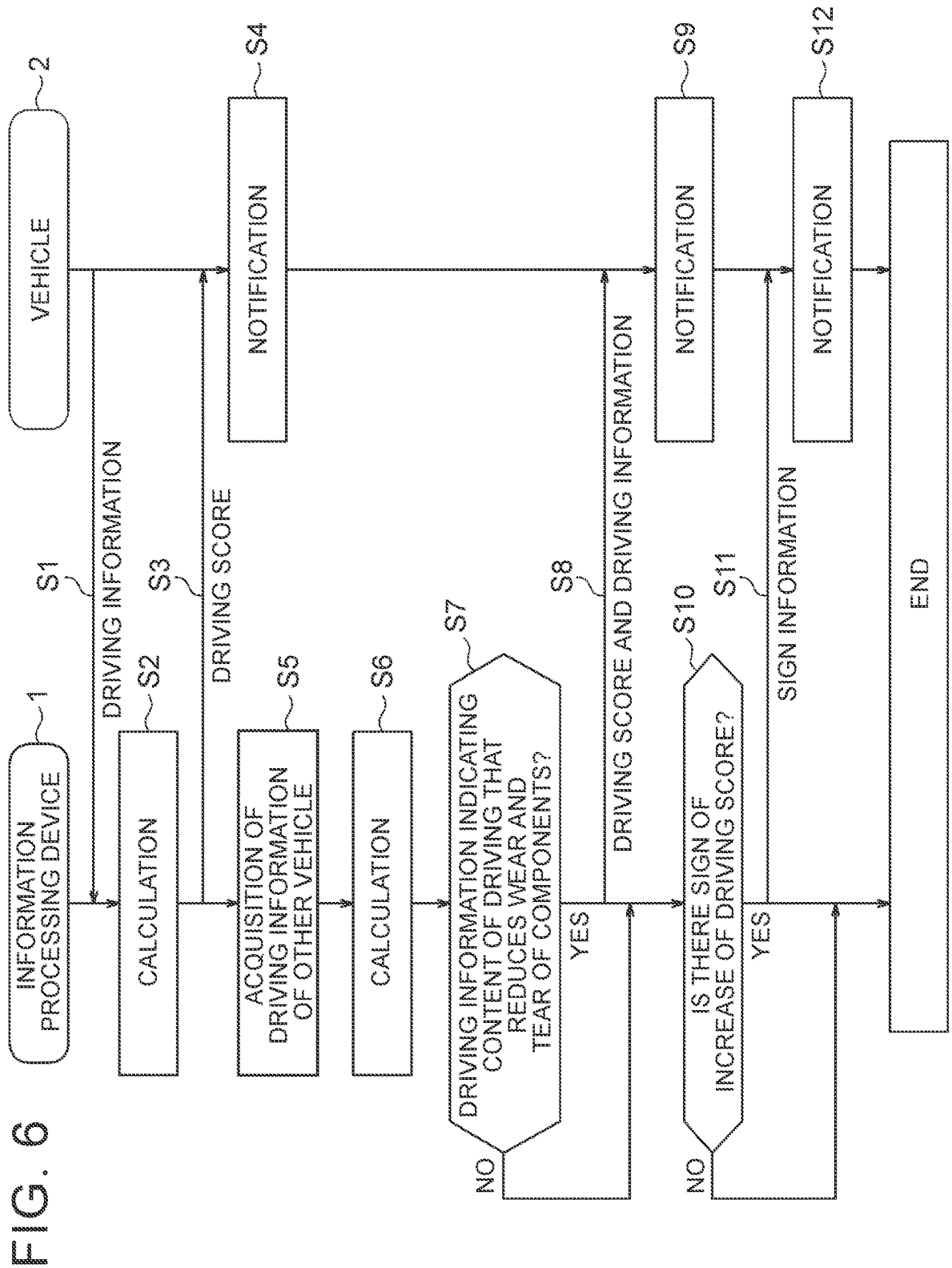
FIG. 6 is a sequence diagram showing an operation of the information processing system.

An information processing method performed by the information processing device 1 of the present embodiment will be described with reference to FIG. 6.

In step S1, the information processing device 1 acquires driving information from the vehicle 2 at a given point of time.

In step S2, the information processing device 1 calculates the driving score from the driving information.

In step S3, the information processing device 1 transmits the driving score to the vehicle 2.

In step S4, the vehicle 2 notifies the driver of the driving score. The notification may be provided by projection display or by voice.

In step S5, the information processing device 1 acquires the driving information of the other vehicle 3.

In step S6, the information processing device 1 calculates the driving score from the driving information.

In step S7, the information processing device 1 determines whether the driving information of the other vehicle 3 indicates content of driving that reduces wear and tear of the components.

When Yes in step S7, the information processing device 1 transmits the driving score and the driving information of the other vehicle 3 in step S8.

In step S9, the vehicle 2 notifies the driver of the driving score and the driving information.

When No in step S7, the information processing device 1 does not execute step S8.

In step S10, the information processing device 1 determines whether there is a sign of increase of the driving score of the other vehicle 3 from the past driving information of the other vehicle 3.

When Yes in step S10, the information processing device 1 transmits sign information indicating the presence of sign to the vehicle 2 in step S11.

In step S11, the vehicle 2 notifies the driver of the sign information.

When No in step S10, the information processing device 1 does not execute step S11.

As described above, according to the present embodiment, the information processing device 1 acquires the driving information of the other vehicle 3 traveling around the vehicle 2 via the communication unit 12. When the driving information indicates the content of driving that reduces wear and tear of the components of the other vehicle 3, the information processing device 1 transmits at least part of the driving information to the vehicle 2 via the communication unit 12. With this configuration, the information processing device 1 can notify the driver of the vehicle 2 of the content of driving that reduces wear and tear of the components, and thus can attract the attention of the driver who wants to extend the life of the components.

Further, according to the present embodiment, the control unit 11 acquires the driving information of the vehicle 2 via the communication unit 12, and calculates the driving score regarding wear and tear of the components from the acquired driving information. The control unit 11 transmits the calculated driving score to the vehicle 2 via the communication unit 12. With this configuration, the information processing device 1 can notify the driver of the driving score regarding wear and tear of the components of the vehicle 2. Thus, the driver can easily know the status of wear and tear of the components.

Further, according to the present embodiment, the information processing device 1 calculates the driving score regarding wear and tear of the components from the driving information of the other vehicle 3 and transmits the calculated driving score to the vehicle 2. With this configuration, the information processing device 1 can notify the driver of the vehicle 2 of the driving score of the other vehicle 3. Thus, the driver of the vehicle 2 can know the status of wear and tear of the components of the other vehicle 3 and use the status as a reference for driving the vehicle 2.

Further, according to the present embodiment, when the information processing device 1 determines that the driving score of the other vehicle 3 is higher than the driving score of the vehicle 2, the information processing device 1 notifies the vehicle 2 to imitate the content of driving of the other vehicle 3. When the information processing device 1 detects that the content of driving of the other vehicle 3 has been imitated in the vehicle 2, the information processing device 1 increases the driving score of the vehicle 2. With this configuration, the information processing device 1 can extend the life of the components of the vehicle 2.

Further, according to the present embodiment, the information processing device 1 further transmits to the vehicle 2 at least one of the ranking of the driving score of the other vehicle 3 and the component cost reduced by the content of driving of the other vehicle 3. With this configuration, the information processing device 1 can further attract the attention of the driver of the vehicle 2.

Further, according to the present embodiment, when the information processing device 1 detects the sign of increase of the driving score of the other vehicle 3 from the driving information of the other vehicle 3, the information processing device 1 transmits the sign information indicating the presence of the sign to the vehicle 2. With this configuration, the information processing device 1 can cause the driver of the vehicle 2 to pay attention to the driving of the other vehicle 3, so that the attention of the driver of the vehicle 2 can be further attracted.

Although the present disclosure has been described above based on the drawings and the embodiment, it should be noted that those skilled in the art may make various modifications and alterations thereto based on the present disclosure. Other changes may be made without departing from the scope of the present disclosure. For example, the functions included in each unit or step can be rearranged so as not to be logically inconsistent, and a plurality of units or steps can be combined into one or divided.

For example, in the above embodiment, a program that executes all or part of the functions or processes of the information processing device 1 can be recorded in a computer-readable recording medium. The computer-readable recording medium includes a non-transitory computer-readable medium such as a magnetic recording device, an optical disc, a magneto-optical recording medium, or a semiconductor memory. The distribution of the program is carried out, for example, by selling, transferring, or renting a portable recording medium such as a digital versatile disc (DVD) or a compact disc read-only memory (CD-ROM) on which the program is recorded. Further, the distribution of the program may be performed by storing the program in a storage of a server and transmitting the program from the server to another computer. Further, the program may be provided as a program product. The present disclosure can also be realized as a program that can be executed by a processor.

The computer temporarily stores the program recorded in the portable recording medium or the program transferred from the server in the main storage device, for example. The computer then causes the processor to read the program stored in the main storage device, and causes the processor to execute processes in accordance with the read program. The computer may read the program directly from the portable recording medium and execute processes in accordance with the program. The computer may execute the processes in accordance with the received program each time the program is transferred from the server to the computer. The processes may be executed by a so-called ASP service that realizes the function only by execution instruction and result acquisition without transferring the program from the server to the computer. The term "ASP" is an abbreviation for "application service provider". The program includes information that is used for processing by electronic computers and is equivalent to a program. For example, data that is not a direct command to a computer but has the property of defining the processing of the computer corresponds to the "information equivalent to a program".

What is claimed is:

1. An information processing device that is able to communicate with a vehicle, the information processing device comprising:
   a control unit; and
   a communication unit, wherein the control unit
     acquires driving information of another vehicle traveling around the vehicle via the communication unit;
     transmits at least part of the driving information to the vehicle via the communication unit when the driving information indicates content of driving that reduces wear and tear of a component of the other vehicle,
   wherein the control unit
   acquires driving information of the vehicle via the communication unit,
   calculates a driving score regarding wear and tear of a component from the driving information of the vehicle,
   transmits the calculated driving score to the vehicle via the communication unit,
   calculates a driving score regarding wear and tear of the component from the driving information of the other vehicle, and
   transmits the calculated driving score to the vehicle,
   wherein when the control unit determines that the driving score of the other vehicle is higher than the driving score of the vehicle, the control unit notifies the vehicle to imitate the content of driving of the other vehicle.

2. The information processing device according to claim 1, wherein when the control unit detects that the content of driving of the other vehicle has been imitated in the vehicle, the control unit increases the driving score of the vehicle.

3. The information processing device according to claim 1, wherein when the control unit detects a sign of an increase of the driving score of the other vehicle from the driving information of the other vehicle, the control unit transmits sign information indicating presence of the sign to the vehicle.

4. A vehicle equipped with the information processing device according to claim 1.

5. An information processing device that is able to communicate with a vehicle, the information processing device comprising:
a control unit; and
a communication unit, wherein the control unit
acquires driving information of another vehicle traveling around the vehicle via the communication unit,
transmits at least part of the driving information to the vehicle via the communication unit when the driving information indicates content of driving that reduces wear and tear of a component of the other vehicle,
acquires driving information of the vehicle via the communication unit,
calculates a driving score regarding wear and tear of a component from the driving information of the vehicle,
transmits the calculated driving score to the vehicle via the communication unit,
calculates a driving score regarding wear and tear of the component from the driving information of the other vehicle,
transmits the calculated driving score to the vehicle, and
transmits to the vehicle at least one of a ranking of the driving score of the other vehicle and a component cost reduced by the content of driving of the other vehicle.

6. A non-transitory storage medium storing instructions that are executable by one or more processors and that cause the one or more processors to perform functions comprising:
acquiring driving information of another vehicle traveling around the vehicle;
transmitting at least part of the driving information to the vehicle when the driving information indicates content of driving that reduces wear and tear of a component of the other vehicle;
acquiring driving information of the vehicle;
calculating a driving score regarding wear and tear of a component from the driving information of the vehicle;
transmitting the calculated driving score to the vehicle;
calculating a driving score regarding wear and tear of the component from the driving information of the other vehicle;
transmitting the calculated driving score to the vehicle; and
notifying the vehicle to imitate the content of driving of the other vehicle when determining that the driving score of the other vehicle is higher than the driving score of the vehicle.

7. The non-transitory storage medium according to claim 6, wherein the one or more processors are caused to further execute increasing the driving score of the vehicle when detecting that the content of driving of the other vehicle has been imitated by the vehicle.

8. An information processing method with an information processing device that is able to communicate with a vehicle, the information processing method comprising:
acquiring driving information of another vehicle traveling around the vehicle;
transmitting at least part of the driving information to the vehicle when the driving information indicates content of driving that reduces wear and tear of a component of the other vehicle;
acquiring driving information of the vehicle;
calculating a driving score regarding wear and tear of a component from the driving information of the vehicle;
transmitting the calculated driving score to the vehicle;
calculating a driving score regarding wear and tear of the component from the driving information of the other vehicle;
transmitting the calculated driving score to the vehicle; and
notifying the vehicle to imitate the content of driving of the other vehicle when determining that the driving score of the other vehicle is higher than the driving score of the vehicle.

9. The information processing method according to claim 8, further comprising increasing the driving score of the vehicle when detecting that the content of driving of the other vehicle has been imitated by the vehicle.

* * * * *